United States Patent [19]

Kung et al.

[11] Patent Number: 5,005,209
[45] Date of Patent: Apr. 2, 1991

[54] PROCESS AND APPARATUS FOR THE TRANSMISSION OF SELECTIVE ADDRESSES AND/OR EMERGENCY MESSAGES IN SHORTWAVE RADIO NETWORKS

[75] Inventors: Roland Kung, Wolfhausen; Hanspeter Widmer, Zurich, both of Switzerland

[73] Assignee: Zellweger Telecommunications AG, Hombrechtikon, Switzerland

[21] Appl. No.: 213,601

[22] Filed: Jun. 30, 1988

[51] Int. Cl.[5] ............................................. H04Q 7/00
[52] U.S. Cl. ........................................ 455/32; 455/62; 375/40; 375/82; 340/825.58
[58] Field of Search ................. 340/825.21, 825.52, 340/825.58; 455/33-36, 62, 59, 32, 38; 375/116, 120, 40, 82

[56] References Cited

U.S. PATENT DOCUMENTS

| | | | |
|---|---|---|---|
| 3,289,082 | 11/1966 | Shumate | 375/42 |
| 4,518,922 | 5/1985 | Luecke | 375/120 |
| 4,555,806 | 11/1985 | Lange et al. | 455/62 |
| 4,583,090 | 4/1986 | Eden et al. | 340/825.58 |
| 4,596,022 | 6/1986 | Stoner | 340/825.58 |
| 4,613,976 | 9/1986 | Sewerinson et al. | 375/52 |
| 4,616,364 | 10/1986 | Lee | 375/40 |
| 4,628,517 | 12/1986 | Schwarz et al. | 455/59 |
| 4,733,402 | 3/1988 | Monsen | 375/100 |
| 4,853,686 | 8/1989 | Kueng et al. | 340/825.58 |

Primary Examiner—Reinhard J. Eisenzopf
Assistant Examiner—Andrew Faile
Attorney, Agent, or Firm—Burns, Doane, Swecker & Mathis

[57] ABSTRACT

Selective addresses and/or emergency messages are transmitted between individual stations by using a calling signal consisting of a synchronization signal and an address signal (SS and AS) sent out by a transmitter. The address signal (AS) used is a FSK signal which forms a diversity pair by being subdivided into two identical m-ary FSK signals. The type of operation used is a Channel in Band Scanning. The apparatus contains an address signal receiver which is realized by Real Time-Digital-Signal processing. As a result, the desired participating stations and only these can be reliably and unequivocally activated. In addition, the process is extremely insensitive to interferences.

23 Claims, 12 Drawing Sheets

PROCESS AND APPARATUS FOR THE TRANSMISSION OF SELECTIVE ADDRESSES AND/OR EMERGENCY MESSAGES IN SHORTWAVE RADIO NETWORKS

BACKGROUND OF THE INVENTION

This invention relates to a process for the transmission of selective addresses and/or emergency messages in shortwave radio networks comprising several stations containing a transmitter and/or a receiver by using a ringing signal consisting of a synchronization and an address signal transmitted from a transmitter.

Shortwave connections mainly use the propagation of spacewaves reflected from the ionosphere for transmitting messages over long distances. In spite of the shortcomings of the transmission channel for a spacewave connection, such as noise interferences in the channel, time variable, dispersive channel response and the presence of selective interference, this type of transmission has recently gained significant importance by virtue of new microprocessing techniques and the low cost compared with satellites.

Today, transmissions are conventionally carried out by the single-sideband technique for economic utilization of the frequency reserve. The frequency of the signal from the audio frequency band (300 Hz to 3.4 kHz) is translated into a selected high frequency (i.e., HF) band at the transmitter end and the reverse operation is carried out by the HF receiver. The received signal is transmitted to the demodulator and decoder circuits in the audio frequency (i.e., AF) range. The HF receivers have automatic gain controls wherein the total output or voltage forms the controlled variable within the selected bandwidth of the receiver channel. Different noise levels and user signal levels are established within wide limits at the output, depending on the spectral occupation of the user signal and interference signal. Selective interferences having a greater signal energy than the user signal are frequently encountered and the channel is then in most cases regarded as occupied.

In a selective calling network, various stations should be capable of being activated singly or by use of a collective code. The selective calling transmitters and receivers of the individual stations are accommodated in their modulator and demodulator block. The calling signals are composed of a set of suitable amplitude-time functions which the individual receivers can recognize in the channel noise and distinguish from one another. Even when the quality of transmission is poor, no false stations should be activated and the required stations should always be activated.

The conventional pilot sound transmissions used at present are not capable of fulfilling these requirements because the probability of faulty synchronization increases with the presence of certain interferences.

It is known to use a relatively complicated system of equipment in addition to the transmitter-receiver parts of the stations for determining which channel is free and undisturbed by neighboring transmitters and for determining the momentary conditions of propagation over the ionosphere ("Assessing HF Propagation Conditions in Real Time", Defense Electronics, May 1980, pages 21, 22). A fully automatic setup of a shortwave communication cannot be obtained with this system. When interference (jammers) are deliberately produced (electronic counter measurement—ECM), previous channel analysis is of little use since the interference always occurs instantaneously in the channel in use.

European Patent Application No. 87 105 972.1 (=EP-A-0 243 885) of 23.04.1987 describes a process by which fully automatic shortwave connections can be set up between individual stations and only the desired stations are activated even when the quality of transmission is poor. This is achieved by using a very pronounced synchronization signal which is adapted to the transmission channel and is composed of narrow band marking and space signals which form the part signals of a diversity pair.

SUMMARY OF THE INVENTION

It is an object of the present invention to provide an address signal which unequivocally and reliably activates the required participating stations and only these and which is as far as possible insensitive to interferences.

This problem is solved according to the invention by using, as an address signal, a frequency shift keying (i.e., FSK) signal which is subdivided into two identical m-ary FSK signals to form a diversity pair and which uses a channel in band scanning (i.e., CHIBSCAN) as an operating mode. The phrase "m-ary" (m>2) means that each FSK signal of the diversity pair includes m frequencies for encoding an address and/or message.

The use of two identical FSK signals forming a diversity pair opens up the possibility of separate detection of these part signals, whereby the reliability of transmission is greatly increased since the probability of an interference signal exactly affecting the address signal being present simultaneously in both diversity channels is very slight. Moreover, the m-ary FSK modulation has the advantage that for a given bandwidth and a given number of code words with a particular hamming distance, the address sequences can be kept very short. The operating mode of the channel in band scanning (CHIBSCAN) provides a high degree of immunity against in-band interferences.

The invention further relates to an apparatus for carrying out the above-mentioned process with an address signal receiver.

The apparatus according to the invention is characterized in that the address signal receiver has an analog input part and a signal processor for numerical signal processing, which signal processor carries out a transformation of the pulses in the frequency space by means of a fast Fourier transformation (FFT).

BRIEF DESCRIPTION OF THE DRAWINGS

Other objects and advantages of the present invention will become apparent from the following detailed description of a preferred embodiment as described in conjunction with the accompanying drawings in which.

DESCRIPTION OF THE PREFERRED EMBODIMENT

Figure 1:
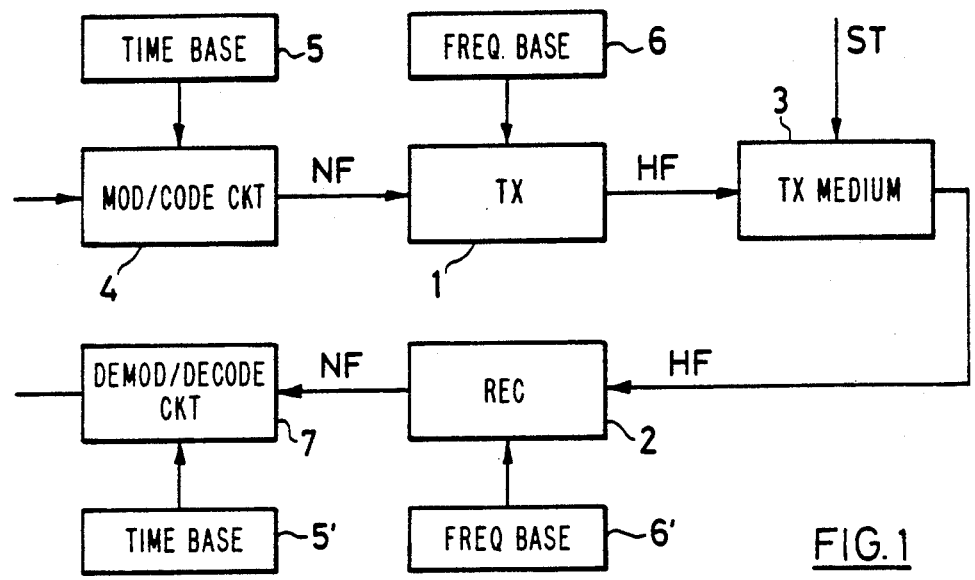
FIG. 1 is a block diagram circuit of a conventional shortwave connection with transmitters and receivers.

According to FIG. 1, a shortwave connection conventionally used nowadays consists of a transmitter and a receiver 2 between which the signals are transmitted by way of a transmission medium 3. The data input at the transmitter end is fed to a modulator/code circuit 4 with which a time base 5 is associated. The output signal of the modulator/code circuit 4 is an AF signal in the audio frequency band of from 300 Hz to 3.4 kHz. The transmitter 1, which is a high frequency single-sideband (i.e., HF-SSB) transmitter, carries out a frequency translation with this AF signal into a selected HF band. A frequency base 6 in the region of the HF band is associated with the transmitter 1. The HF output signal of the transmitter 1 transmitted into the time variable transmission medium 3 may be in the region of, for example, 3 to 30 MHz. An additive interference noise designated ST is added to this HF signal in the transmission medium 3.

In the HF-SSB (high frequency single-sideband) receiver 2, with which a HF-frequency base 6' is associated, the received HF signal is mixed down into an AF signal in the audio frequency band and transferred to a demodulator/decoder circuit 7.

When a shortwave radio network forms a so-called selective calling network, then it contains a number of different stations which can be activated either singly or with a broadcast call. For this purpose, each of the participating stations has a selective calling transmitter and receiver which is accommodated in the modulator and demodulator block 4 and 7 of the arrangement of FIG. 1 (see, for example, DE-PS 32 11 325). The signals for call-up, the so-called calling or ringing signals, are composed of a set of suitable amplitude-time functions which the individual receivers can recognize in the channel noise and distinguish from one another.

Figure 2:
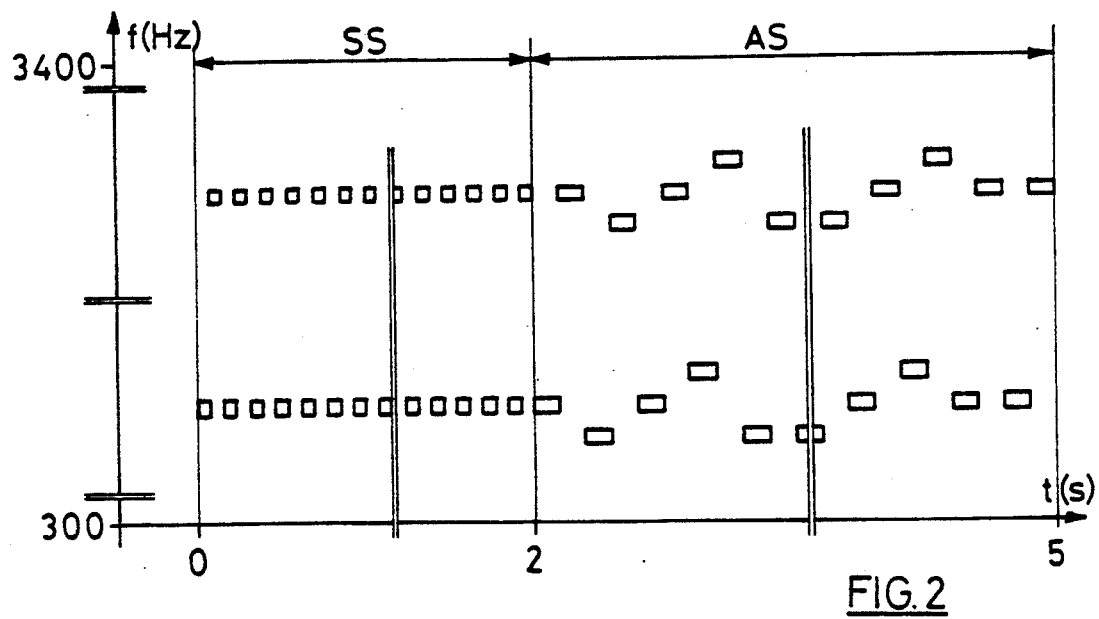
FIG. 2 is a schematic representation of a calling signal.

FIG. 2, which is a time-frequency diagram in which the frequency is entered in Hertz on the ordinate and time t in seconds on the abscissa, shows a calling signal used in the process according to the invention, consisting of a synchronization signal designated SS and an address signal designated AS. The synchronization signal SS and synchronization of the receiver will not be described here in detail but reference may be had for this purpose to EP-A-0 243 885, the disclosure of which is hereby incorporated by reference. The description which follows is based on the assumption that a sufficiently accurate frequency and time synchronization had been carried out before transmission of the address signal AS.

The code word referred to as the address signal AS in this description may have two meanings, i.e. it may represent a selective address or an emergency message.

A selective calling address serves to distinguish unequivocally and reliably between several participants in a radio network which share the frequencies to be used. Only the stations which are participating should be activated in each case and the other stations should be left untouched. Within an extended protocol or when a single connection is being operated, the meaning of an emergency call may be imparted to the code word. One example of this would be the reliable transmission of emergency messages between two or more stations which do not have a qualitatively sufficient connection for normal data exchange. In such a case, the set of messages are defined before they are sent out and if necessary they are displayed as written text in the receiver. The receiver must then be capable of comparing all defined code words with the reception sequence. Examples of such emergency messages would be "Ship sinking—Rescue helicopter required" or "Channel disturbed—Frequency changed to 4th frequency on the List", and the like. Each letter in the alphabet may be associated with an emergency code so that transmission may be carried out as in a morse code.

Thus, whereas the synchronization signal SS synchronizes every receiver on the same channel as to frequency and bit timing, the address signal AS activates only the selectively tapped stations and thereby enables them to find the beginning of the word of a subsequent transmission. The address signal AS thus carries out a word synchronization in the appropriate receivers.

As may be seen from FIG. 2, the address signal AS forms a diversity pair in the same way as the synchronization signals SS described in the aforementioned EP-A-0 243 885. The duration is limited to about 2 or 3 seconds and the bandwidth to less than 100 Hz. This enables the frequency offset between the two stations to be as large as possible within the 500 Hz reception bandwidth or, alternatively, very narrow ZF filters may be used in a stable apparatus. Since narrow band signals can be more easily detected in extremely densely occupied bands than broad band signals due to the irregular spectral energy distribution, better utilization of spectral energy holes for the narrow band signals is possible.

The solution found was a Channel in Band system (i.e., CHIBSCAN) which is operated in a scanning search of the 3 kHz bandwidth SSB radio channel. This mode of operation, which provides a high degree of immunity against In-Band interferences, will be described in more detail with reference to FIG. 5.

Since the limitation of the band width also limits the signal rate, an m-ary, for example a ternary signal with FSK modulation is used to permit the address frequencies to be kept as short as possible at a given bandwidth and a given number of codes with a particular hamming distance. For a ternary signal, $m = 3$.

Figure 3:
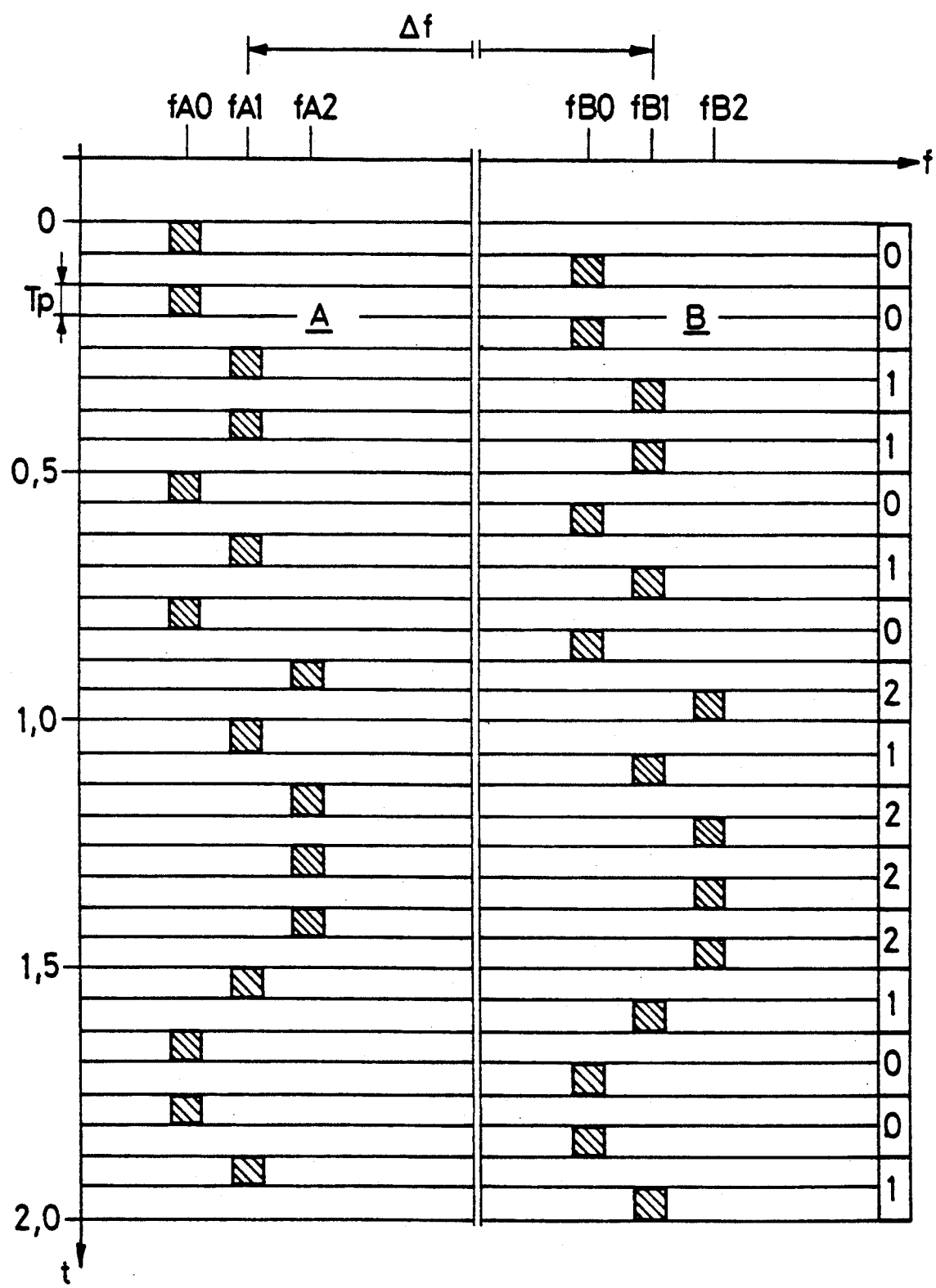
FIG. 3 is a schematic representation of the pulses of an address signal in the time-frequency plane.

FIG. 3 is a schematic representation of the pulses of such a diversity pair with $m = 3$ in the time-frequency plane, in which the frequency f is entered on the abscissa and the time t in seconds is entered on the ordinate.

The time-frequency plane is divided into two halves (i.e., diversity pair) according to the frequency, each half corresponding to a part channel A or B.

Three tones are used (i.e., $m = 3$) in each of the two part channels A and B. These tones are situated at the frequencies $fA0$, $fA1$ and $fA2$ and the frequencies $fB0$, $fB1$ and $fB2$. The frequency distance between corresponding tones of the two part channels, in other words between the diversity pair, is marked as delta f. A signal unit of length Tp consists of a rectangular pulse which is modulated with one of the three possible carriers corresponding to the ternary source symbols. The ternary sequences corresponding to the individual tones are entered in a column at the right hand edge of the Figure.

The signal rate for the ternary source symbols is different from the bit rate and is fixed at a particular value, for example at 16 Bd in adaptation to the 16 Hz modulation frequency of the synchronization signal SS (see EP-A-0 243 885). Fixing this value has the advantage that the phase angle computed for the synchronization signal is an exact measure of the time deviation of the symbol synchronization. The length Tp corresponding to the reciprocal of the symbol rate then becomes 62.5 ms. This long pulse provides for good utilization of the coherence time, which is in most cases longer than 100 ms. It has the added advantage of virtually eliminating the sensitivity to multipath propagation in long distance connections.

Another advantageous property of the diversity pair illustrated in FIG. 3 is that the transmission signal has an envelope curve which is constant as a whole so that optimum transmitter power amplifier utilization results.

According to FIG. 3, only every second time interval of the two ternary signals is occupied by a pulse. No energy is therefore detected in the interpulse intervals except any selective disturbance factors that may happen to be present and that are situated in the immediate range of the three FSK frequencies. This characteristic may be used for subtractive elimination of the selective interference. Information concerning any possible time synchronization error may also be determined from the deviations of the frequency/time raster of FIG. 3.

In the example illustrated in FIGS. 2 and 3, the distance between the individual FSK frequencies (e.g. $f_{A1}$ to $f_{A0}$ is chosen to be 24 Hz. The bandwidth is therefore about 70 Hz and the tones are sufficiently decoupled against cross-talk for the required demodulation procedure to enable them to be regarded as individual orthogonal signals. The time required for a transmission should be determined by the quality of the channel. In practice, the time would be based on a basic time of about 3 times Ta, where Ta is the duration of the address signal. Depending on the signal/noise ratio in the particular channel, the basic time is increased by automatic repetition according to a scheme shown in FIG. 4. As shown in this figure, a normal calling signal of the type illustrated in FIG. 2 is first sent out with a synchronization signal SS and an address signal AS (in each case the upper line of FIG. 4 designated transmitter TX ON/OFF) and the receiver to which the signals are transmitted should be activated after a time interval of 2Ta and confirm the address (in each case the lower line of FIG. 4 designated, receiver RX ON/OFF). Repetition of the address signal AS takes place after a time interval of 3Ta. After a time interval of 5Ta, the entire calling signal is repeated, the synchronization signal SS being first repeated twice, followed by five repetitions of the address signal AS, the address signals being separated by a response slot for the receiver of length Ta. Then follows a second repetition of the entire calling signal with four-fold synchronization signal SS and eight-fold address signal AS.

Figure 4:
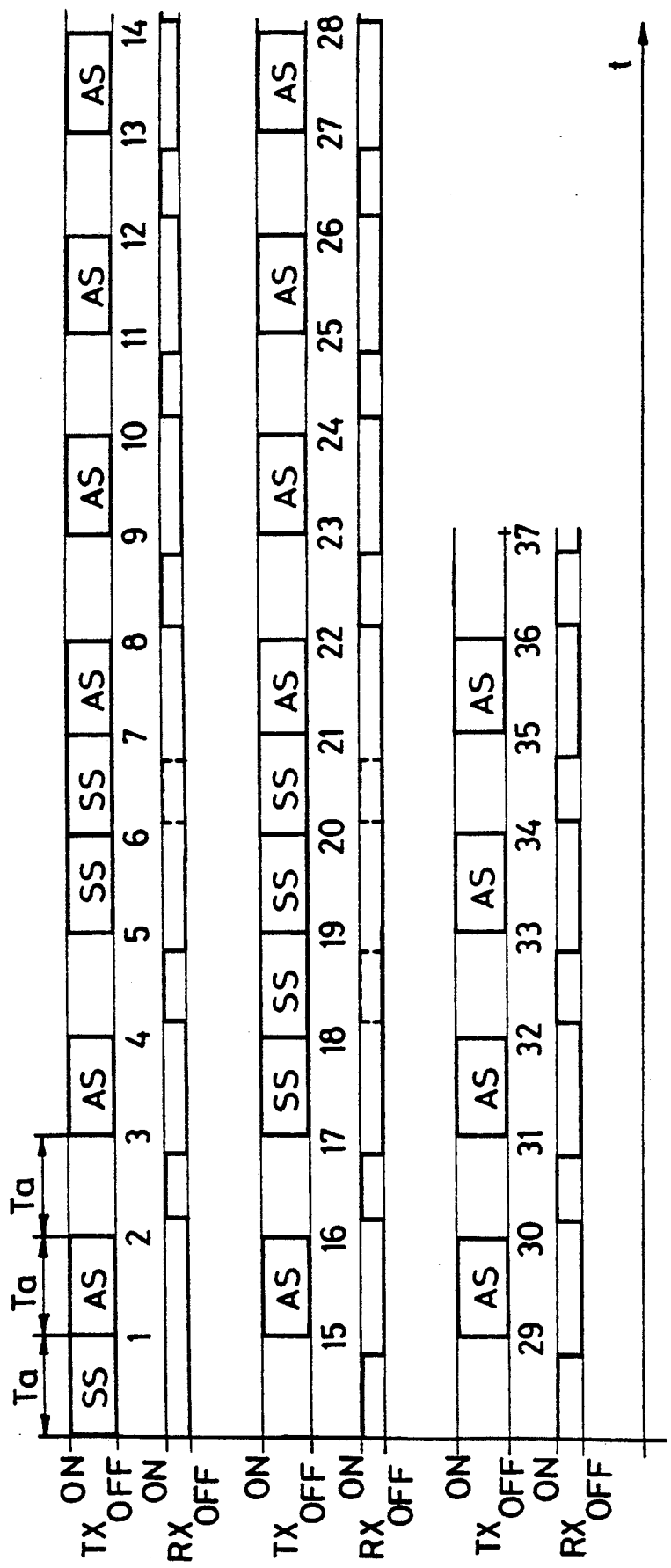
FIG. 4 is an example of a calling protocol for link establishment.

The repetitive transmission illustrated in FIG. 4 increases the probability of detection by allowing further signal accumulation in the receiver. This requires a receiver referred to in the literature as MARQ-=Automatic Repeat Request with Memory, equipped with a memory which decides on the last received data by making use of all preceding values as so-called Soft Decision values. A similar principle is described in "An efficient ARQ technique with Memory" by G. Benelli in Alta Frequenza No. 4, 1984.

The calling program illustrated in FIG. 4 may also be used for the transmission of emergency messages instead of address signals. For a combination of address and emergency messages, the emergency message is attached and treated in the same manner after confirmation of the address by the called station or alternatively it is distinguished from the addresses by a specified frequency shift in relation to the three address-FSK frequencies. The station which initially receives can produce a receipt confirmation after detection. This confirmation is preferably of the same construction and therefore provides the initial calling station with possibility of exact synchronization. This is an advantage in view of the fact that in shortwave connections there is in most cases no simultaneity at the two stations. Moreover, the initial receiving station can also transmit address signals AS and thereby be interrogated at a distance, for example for transmission of measured values.

An important difference must now be pointed out between the recognition of a selective address and the recognition of an emergency call. For the recognition of the selective address, the received address signal AS must be correlated with the device's own address (and only with that) whereas for the recognition of emergency calls, correlation with all possible address signals is necessary because in this case all signals are important for the receiver.

Figure 5:
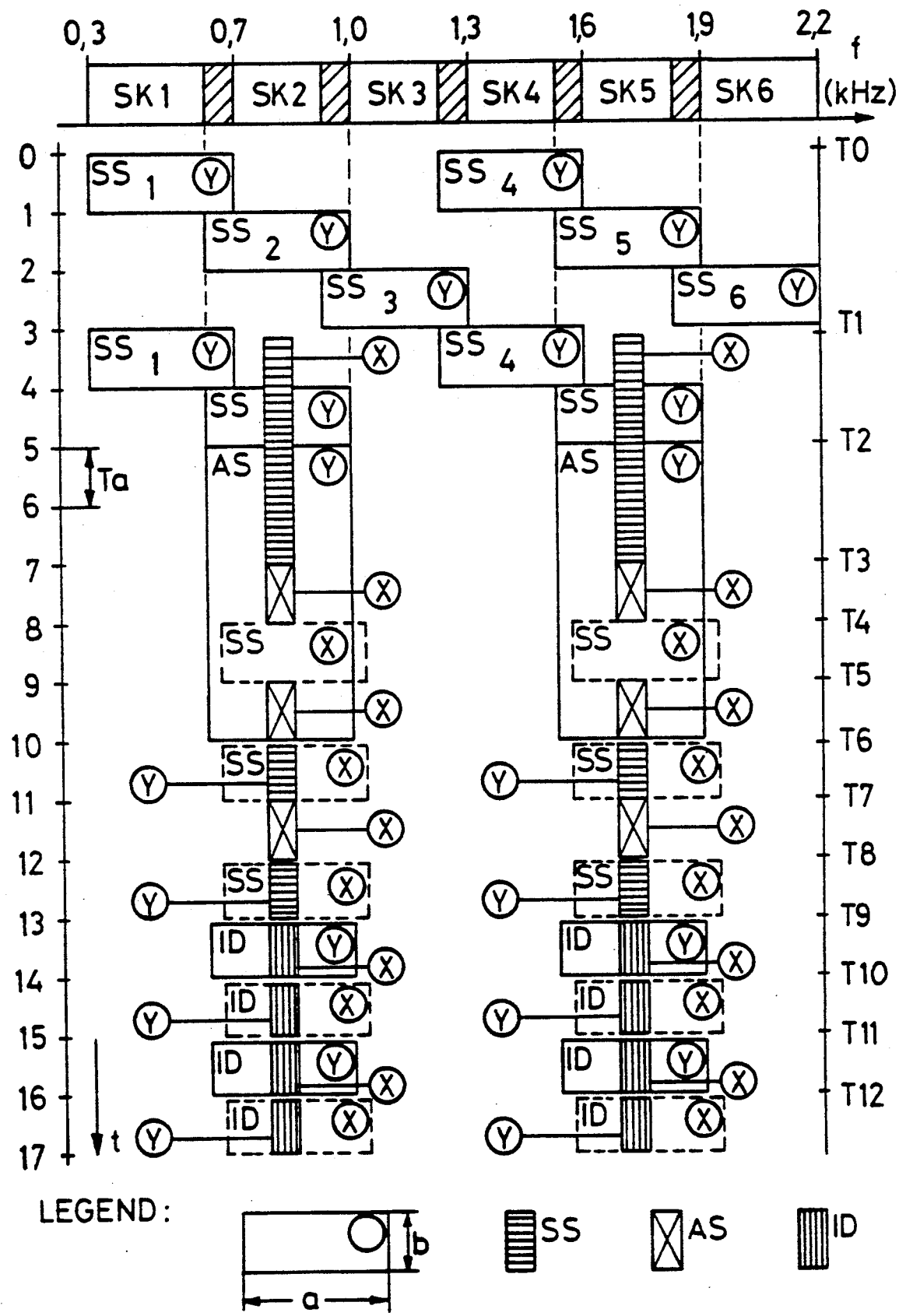
FIG. 5 is a flow chart of an operating mode in which the receiver runs in the so-called CHIBSCAN mode.

FIG. 5 represents the flow chart of a communication system in which a station X calls a station Y and the station Y is operating in the above-mentioned CHIBSCAN mode. The symbols used in the diagram are explained in the legend to FIG. 5. The first signal from the left in the legend means that the station entered in the circle of the symbol listens for the reception of the given signal If Y and, for example, AS are entered in the circle and box, this means that station Y is listening to the address signal AS. The dimension a of the symbol indicates the subchannel region and the dimension b indicates the duration of observation. The other three symbols given represent the transmission of the signal (synchronization signal SS, address signal AS or identification ID) by the station shown in the circle.

The frequency f is entered in kilohertz on the abscissa of FIG. 5 and the time t on the ordinate. The distance between the individual consecutively numbered points in time represent the duration Ta of an address signal AS (FIG. 4). At the right hand edge of the figure, parallel to the ordinate, is a straight line on which various time points T0 to T12 are entered. The reception channel is entered above the abscissa As shown in the drawing, the reception channel, which extends over about 2 kHz in the example described, is subdivided into six sub-channels SK or three pairs of sub-channels, each of which has a shaded region of overlap. The receiver carries out a continuous search in these pairs of sub-channels and stops this search as soon as a synchronization signal SS has been detected From the moment marked by T0, the station Y is set at synchronization signal reception in the CHIBSCAN mode. The length of a scanning cycle is 3Ta. At the moment T1, station X begins to call and sends out a synchronization signal SS in both part channels (FIG. 3). At the moment T2, station Y has synchronized in the sub-channels SK2 and SK5 while at the moment T3 the station X begins to transmit an address signal AS. At the moment T4, the station X goes over to reception and listens for a confirmation which must be carried out at Y by the transmission of a synchronization signal. Since station Y has not reacted, station X repeats the address signal AS at the moment T5. Station Y has received the address and transmits a synchronization signal at the time T6. Since station X has not received this signal, station X repeats the address signal at T7. Station Y again replies at T8. Station X receives this reply and begins to transmit the so-called identification ID at T9. At the moment T10, station Y transmits its identification ID which is used for word synchronization at station X and finally, station X repeats the transmission of its identification ID at T11 and Y repeats transmission of its identification at T12. Transmission of the message part can now begin.

One advantageous facility of CHIBSCAN is that the transmitter can select a suitable sub-channel SK for itself within the reception channel before any transmission takes place. Another possibility is that the transmitter and the receiver can frequently change the channel or sub-channel after synchronization; this is referred to in the literature as frequency hopping. If the transmitter and the receiver lost each other in the process, then both fall back to the synchronization mode after a certain time. It is clear from this that perfect operation of such a system presupposes extremely trouble-free operation of the synchronization. Another facility of CHIBSCAN is the superimposition of several radio part networks within a single channel without deliberate mutual interference. In such an arrangement, however, the control stations dispose of all sub-channels.

Users which are independent of one another generally have different frequencies allocated to them and therefore operate in different channels but if at any time it is unavoidable that two networks operate in the same channel then they would either have to use different address signal sets or, if this is not possible, the following procedure would have to be adopted:

After transmission of the address signal, the stations of both networks are activated. To achieve the final access, the address which has just been transmitted is repeated or a second address is transmitted with a frequency shift which is peculiar to each network. This requires exact frequency information and the possibility of exact processing, which can only be achieved by digital signal processing. The problem just described may, however, be solved more easily by searching a much larger address signal set which has a separate sub-set available for each network.

To ensure unequivocal recognition under conditions of severe interference, the individual address signals should be as different from one another as possible. The reason for this is that when the system is used as just described, only the bit timing is recognized at the receiver end so that conventional codes with possibilities of error correction, which operate only with optimum word synchronization, cannot be used in this case. These conventional codes use special preambles which are placed in front of the address signal and serve for word synchronization. This splitting up is particularly undesirable on burst channels since the entire detection is based on two successive part detections.

In the present case, so-called self-synchronizing codes are used instead of these conventional codes with word synchronization. In these self-synchronizing codes, the missing word synchronization is realized by the addition of additional redundancy while the error correction capacity remains the same. The quality of such codes is described in terms of the auto-correlation or cross-correlation function (AKF or KKF) and is a measure of the similarity between one code and another code which is shifted in time relation to the first or an identical code. This is frequently described in the literature as a pseudo random sequence.

One known group of these pseudo random sequences which has many code families and excellent properties is that comprising the so-called gold codes, which are used in the present process. The address signals used are preferably ternary gold codes of which the 28 members of length 26 are listed by way of example in the following Table 1.

TABLE 1

```
 1: 0 0 1 1 0 1 0 2 1 2 2 2 1 0 0 2 2 0 2 0 1 2 1 1 1 2
 2: 0 0 2 1 1 0 1 0 0 2 0 0 2 0 0 1 2 2 0 2 0 0 1 0 0 1
 3: 0 1 1 2 2 2 1 1 1 0 0 0 1 0 2 2 1 1 1 2 2 2 0 0 0 2
 4: 1 0 2 0 1 2 2 2 2 0 0 2 1 2 0 1 0 2 1 1 1 1 0 0 1 2
 5: 0 1 0 2 1 0 0 0 2 0 2 2 0 0 2 0 1 2 0 0 0 1 0 1 1 0
 6: 1 2 2 2 2 1 1 0 2 2 2 1 1 2 1 1 1 1 2 2 0 1 1 1 2 2
 7: 2 1 2 0 0 2 1 0 1 2 1 2 0 1 2 1 0 0 1 2 0 2 1 2 1 0
 8: 1 1 0 1 1 2 1 2 1 1 2 1 2 2 2 0 2 2 1 2 1 2 2 1 2 1
 9: 1 2 1 2 1 2 0 2 0 2 1 0 0 2 1 2 1 2 1 0 1 0 1 2 0 0
10: 2 0 2 2 1 1 0 1 1 1 0 1 0 1 0 1 1 2 2 0 2 2 2 0 2 0
11: 0 1 2 2 0 1 2 2 0 0 1 1 2 0 2 1 1 0 2 1 1 0 0 2 2 1
12: 1 1 2 1 0 0 0 1 2 1 1 0 1 2 2 1 2 0 0 0 2 1 2 2 0 2
13: 1 1 1 1 2 1 2 0 0 1 0 2 0 2 2 2 2 1 2 1 0 0 2 0 1 0
14: 1 0 1 0 0 0 1 1 0 0 2 1 0 2 0 2 0 0 0 2 2 0 0 1 2 0
15: 0 0 0 1 2 2 2 1 2 2 1 1 0 0 0 0 2 1 1 1 2 1 1 2 2 0
16: 0 2 1 0 1 0 2 0 1 1 1 1 1 0 1 2 0 2 0 1 0 2 2 2 2 2
17: 2 0 0 2 2 0 1 2 0 1 1 2 1 1 0 0 1 1 0 2 1 0 2 2 1 2
18: 0 2 2 0 2 2 0 1 0 1 2 2 2 0 1 1 0 1 1 0 2 0 2 1 1 1
19: 2 1 0 0 1 1 2 1 0 2 2 0 1 1 2 0 0 2 2 1 2 0 1 1 0 2
20: 1 2 0 2 0 0 2 1 1 2 0 2 2 2 1 0 1 0 0 1 2 2 1 0 1 1
21: 2 2 2 1 2 0 2 2 1 0 2 0 0 1 1 1 2 1 0 1 1 2 0 1 0 0
22: 2 1 1 0 2 0 0 2 2 2 0 1 2 1 2 2 0 1 0 0 1 1 1 0 2 1
23: 1 0 0 0 2 1 0 0 1 0 1 0 2 2 0 0 0 1 2 0 0 2 0 2 0 1
24: 0 2 0 0 0 1 1 2 2 1 0 0 0 0 1 0 0 0 2 2 1 1 2 0 0 0
25: 2 2 0 1 0 2 0 0 0 0 0 1 1 1 1 0 2 0 1 0 0 0 0 0 2 2
26: 2 2 1 1 1 1 1 1 2 0 1 2 2 1 1 2 2 2 2 2 2 1 0 2 1 1
27: 2 0 1 2 0 2 2 0 2 1 2 0 2 1 0 2 1 0 1 1 0 1 2 1 0 1
28: 0 0 1 0 1 2 1 1 2 0 1 1 1 0 0 2 0 2 1 2 2 1 0 2 2 2
```

These 28 gold sequences of length 26 have at least 46% different characters in all shifts. For larger networks with over 28 participants, families of length N equal to 3 to the n minus 1 power (n is a natural number) may be produced as ternary signals from these sequences or one may go back to m-ary signals with m>3.

The address signal receiver carries out two independent detections and evaluations of the two part-signals of the diversity pair in the same manner as the synchronization signal receiver described in EP-A 0 243 885 and subsequently compares the results. The first operation is an active frequency and bit synchronization with the aid of digital signal processing, in particular the fast Fourier transformation (FFT) within a frequency section of 500 Hz in a radio channel. The two reception signals which have undergone additive interference are converted into a sequence of numerical values by an A/D converter during each observation period T after analog processing (filtering and mixing).

Figure 6:
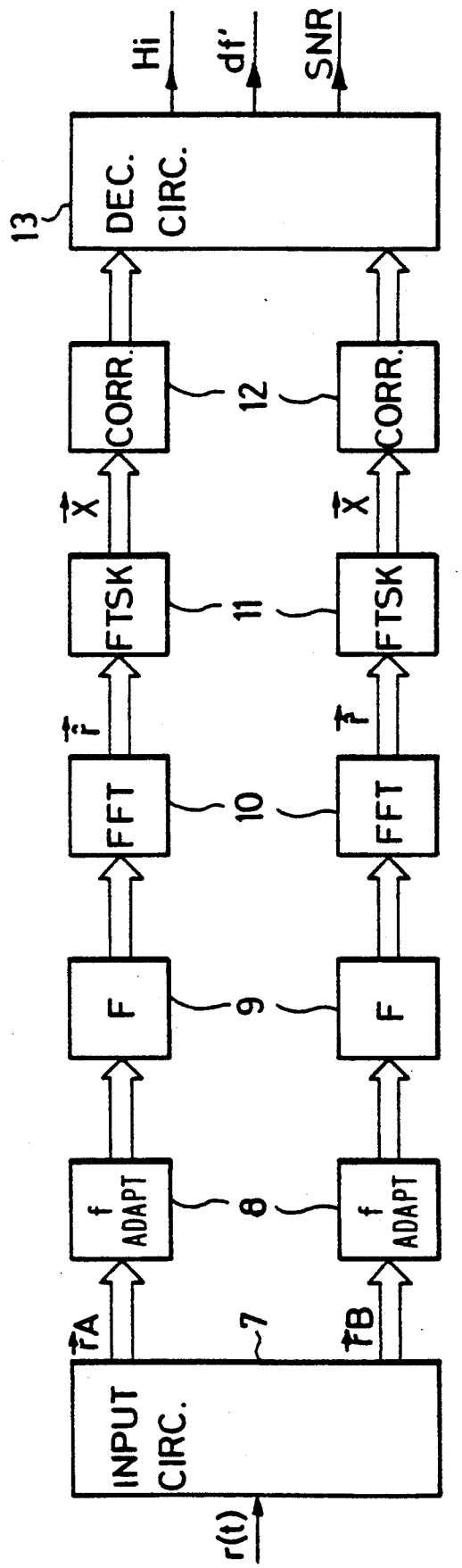
FIG. 6 is a block circuit diagram of an address signal receiver.

FIG. 6 is a block diagram circuit of an address signal receiver according to the invention. It contains an input circuit 7 for the address signal r(t) comprising two outputs producing vectors rA and rB. The signal vectors subsequently enter a frequency adaptation stage 8 and are then weighted with a window function F in stage 9 which is followed by the fast Fourier transformation FFT in state 10. The output signal of stage 10 is marked as vector r.

FTSK-Demodulation (FTSK=Frequency-Time-Shift-Keying) then takes place in stage 11. The output signal of stage 11, marked as vector X, enters an address signal correlator 12. The outputs of the two address signal correlators 12 for the two halves of the diversity pair, signal vector rA and signal vector rB, are transferred to a decision circuit 13 which has three outputs, namely an output Hi (address signal present or absent), an output df (estimation of frequency offset, see FIG. 14) and an output SNR (signal/noise ratio).

The block diagram of FIG. 6 shows the individual function stages of signal processing as carried out by the appropriate part of the address signal receiver formed by a signal processor. Only one half of the diversity receiver (signal vector rA) will be described with reference to the following figures since the two halves are completely symmetrical. The second signal vector rB is used to carry out the same signal processing in the processor, only with different numerical values.

The input circuit 7 corresponds to the receiver circuit E shown in FIG. 5 of EP-A-0 243 885. The analog address signal r(t) passes through this circuit in the same way as the synchronization signal and is FSK-demodulated pulsewise. In the frequency adaption stage 8 the receiving band of 250 Hz-750 Hz is mixed to the next frequency raster, which is a multiple of 8 Hz, by the offset obtained from the preceding synchronization process. The deviation obtained from the time synchronization is corrected so that the pulses are exactly centered in the time section which is to be processed. The pulses are then transformed in the frequency space by means of a 256 point FFT and an observation time T which is twice $T_p = 125$ ms (for Tp see FIG. 3). A 4 term Harris window of twice Tp is used as a preliminary filter to limit the cross-talk of sinusoidal interference signals. Such a FFT is carried out every $T_p = 62.5$ ms.

Resolution of the spectrum of 8 Hz results, and the spectral lines of the ternary (in general terms: m-ary) address signal always lie on the frequency raster as a result of the synchronization. This is also the reason for the choice of 24 Hz frequency deviation of the tones of the m-ary signal.

Figure 7:
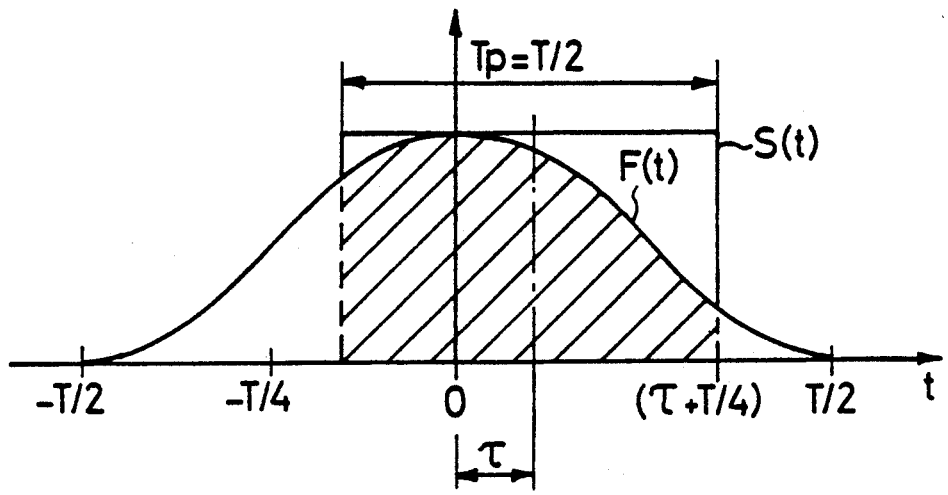
FIG. 7 is a graph to explain the function of a portion of the present invention.

FIG. 7 is the time graph of a FSK pulse S(t) in relation to the FFT window. The pulse S(t) has a length of $T_p = T/2 = 62.5$ ms, the window F(t) a length of T and the error synchronization is equal to Tau.

Figure 8:
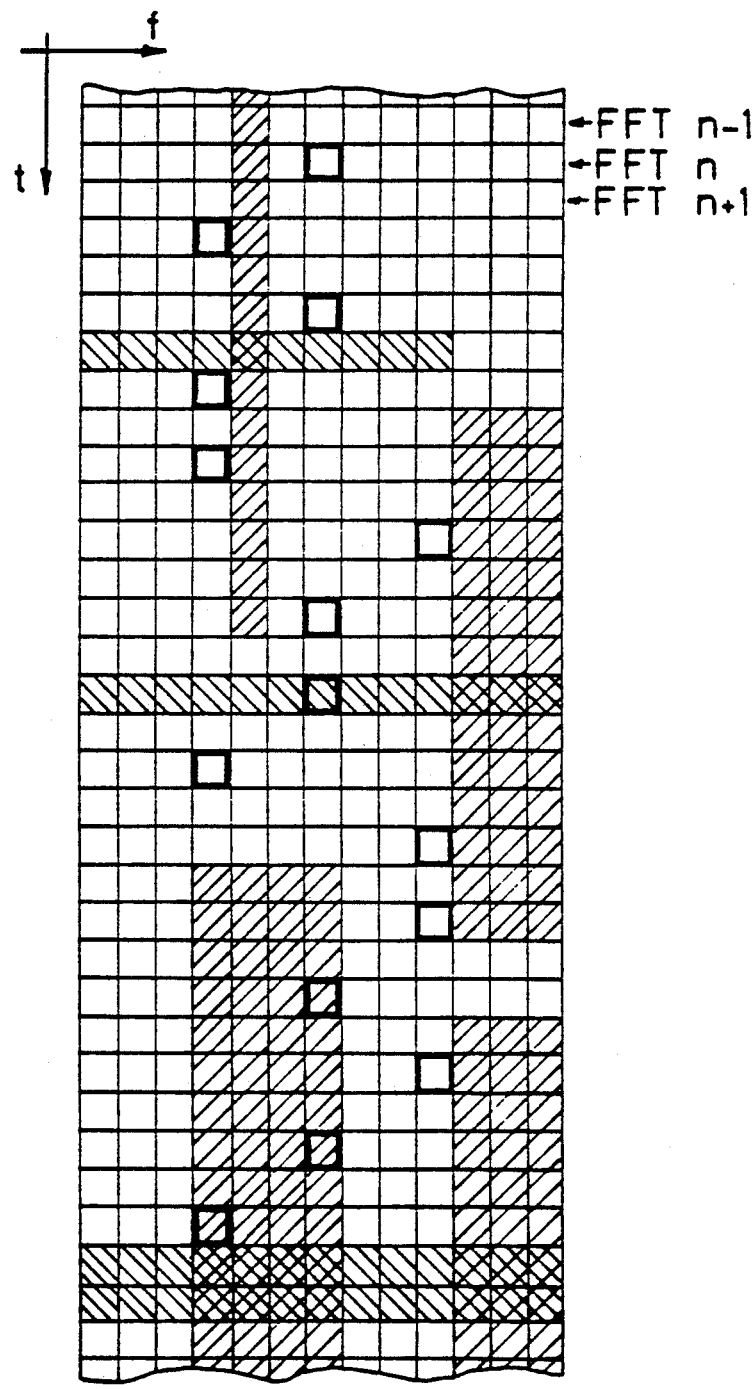
FIG. 8 represents the FFT result values in the discrete time frequency plane.

FIG. 8 shows the FFT output values in the discrete time-frequency plane (see also FIG. 3). This address signal, which gives a picture of the type illustrated after several FFT's, together with interference carriers and noise bursts, is obtained by taking the absolute values (envelope detection) of the discrete complex frequency values at the points where pulse spectra are expected. A pulse is detected during every second interval while in the intermediate intervals only the noise and interference carriers are left.

These known properties of the address signal are utilized by the receiver for eliminating as far as possible the interference carriers in the FTSK demodulator 11. For information on such FTSK systems, see the article "Combined Frequency and Time-Shift-Keyed Transmission Systems" by Frank G. Splitt in IEEE Translation on Communication Systems, December 1963, pages 414–421.

Figure 9:
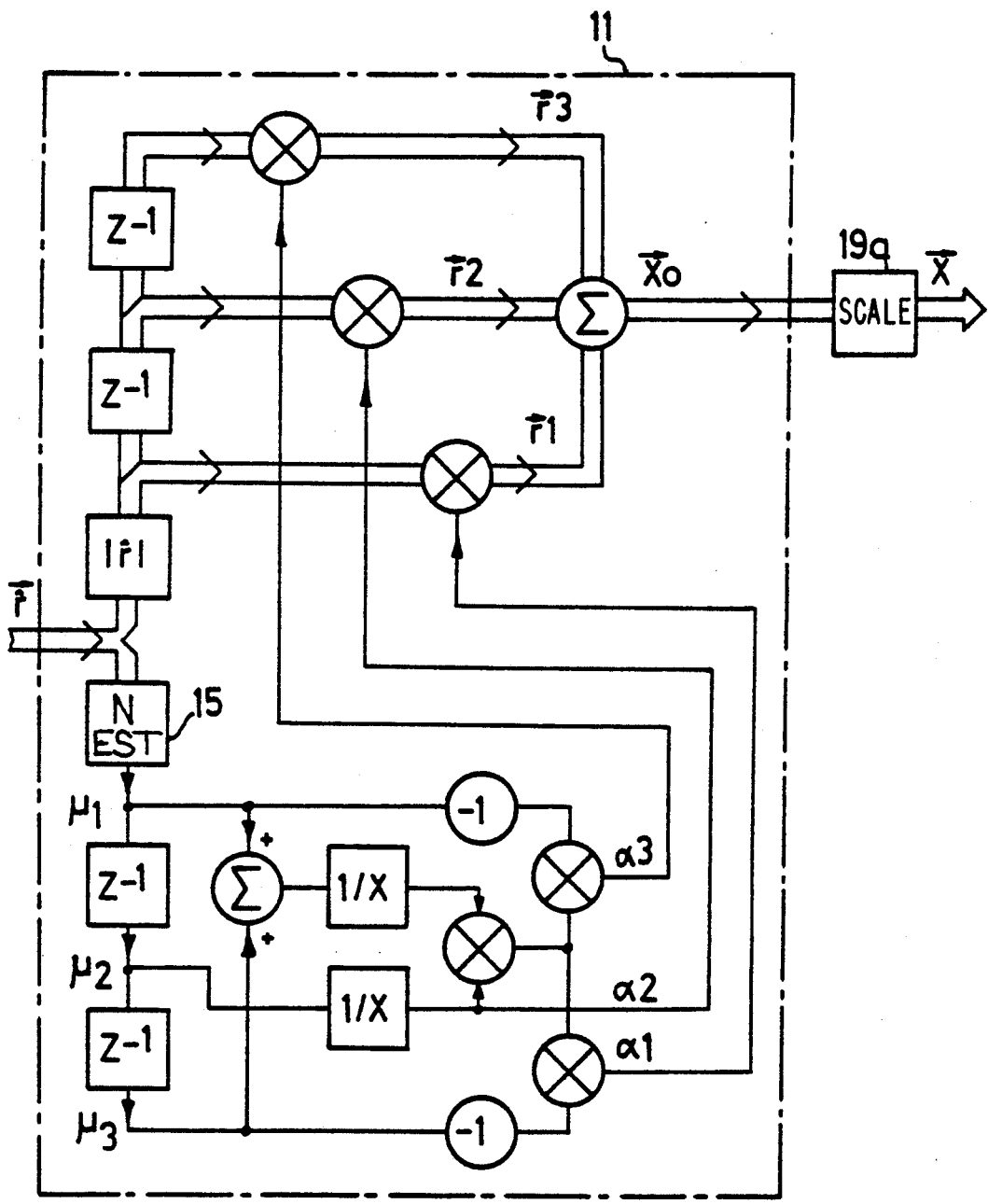
FIG. 9 shows a first detail of FIG. 6.
Figure 10:
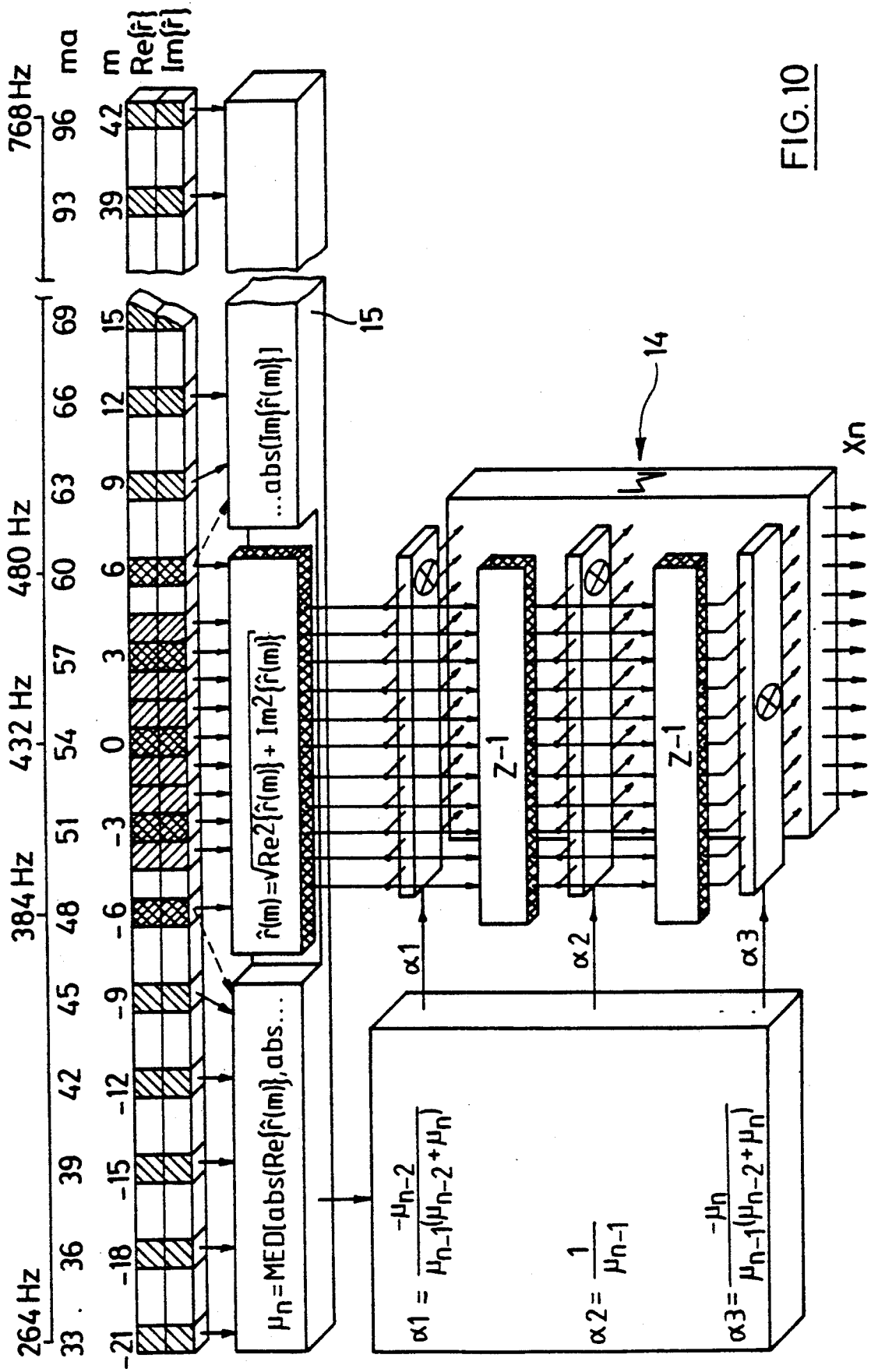
FIG. 10 is a different representation of the detail of FIG. 9.

FIGS. 9 and 10 give two different views of the FTSK demodulator 11. In the normal case, the output values of the (n−1)th and the (n+1)th FFT intervals are subtracted, each with half weight, from those of the nth intervals. This takes place with the adaptive transversal filter 14 with three taps shown in FIG. 9. The signals thus obtained at each of the three possible frequencies are stored. To eliminate the burst interferences, which according to FIG. 8 affect all three frequencies equally, in most cases for a very short time, the coefficients of the transversal filter 14 are not kept constant but weighted with the noise determined in the immediate vicinity by a noise estimator 15. The weights Alpha 1, Alpha 2 and Alpha 3 entered in FIGS. 9 and 10 are obtained. These weights are related as follows:

$$-(\text{Alpha 1} + \text{Alpha 3}) = \text{Alpha 2}.$$

In view of the discrete interference signals to be expected, the noise estimation used is not an average value but a median value of the neighboring spectra. Moreover, the address signal is scaled with the instantaneous noise value so that a decision can subsequently be based on the signal/noise ratio and not on the absolute signal energy. The measure of suppression of the resulting transversal filter depends on the ratio of the energy of the interference carrier to that of the basic noise and virtually not at all to the burst energy.

A bank of non-coherent detectors is built up by means of the FFT operation, which has a resolution of 8 Hz, and the subsequent calculation of the absolute value of the complex spectral values. FIG. 10 shows in the top line the frequency axis of the ternary FSK signal entered in Hertz and below this, the corresponding absolute indices ma resulting from the FFT operation with the aforesaid resolution of 8 Hz, and in the next line are relative indices m associated with the said absolute indices ma. These relative indices are formed by giving the index $m=0$ to the central frequency of the ternary FSK, $m=3$ and $m=-3$ to the adjacent indices and $m=6$ and $m=-6$ to the next adjacent indices, etc.

The indices at $m=-6$, $m=-3$, $m=0$, $m=3$ and $m=6$ serve for address correlation while the inner indices, $m=-3$, $m=0$ and $m=3$, carry the information proper. The indices at $m=-6$ and $m=6$ may be chosen for the transmission of the ternary signal to increase the address range by three out of five frequencies or they may be used for the transmission of additional information.

For monitoring the frequency offset, the indices at $m=-4$, $m=-2$, $m=-1$, $m=1$, $m=2$ and $m=4$ are processed in the same manner as described above. A total of 11 spectral values thus passes through the adaptive transversal filter 14 to suppress interference carriers. The coefficients of the filter are determined by the median values 15 of three successive time intervals. The median values are determined from the remaining uncorrelated spectral values in the pass band. In the example illustrated, this results in 19 components since, on account of the window selected, only every third value is uncorrelated.

The FTSK demodulator 11 which is realized in digital signal processing corresponds to FIGS. 9 and 10, in which the X vector in FIG. 9 has 11 components (vector components Xn in FIG. 10). The calculation of the alpha weights and median values marked by the references My are shown in FIG. 10. In FIG. 9, the index given at My and at alpha indicates the filter stage. In FIG. 10, the indices n−2, n−1, n in the formulae for alpha denote the time sequence of successive FTT intervals.

The values Re and Im for all r correspond to the relative index m of the frequency values of the ternary FSK signal entered in the second line from the top in FIG. 10. Re and Im denote the real component and the imaginary component, respectively, of the complex signal spectrum. The values r(m) and the median indices My are calculated from the values Re and Im according to the formulae in FIG. 10 and the weights, alpha are calculated from the median values. The vector components Xn are determined by means of r(m) and alpha.

The sequence of output vectors Xn of the transversal filter 14 forms a pattern of discrete, "analogous" values as shown in FIG. 8. The address signal correlator 12 now carries out a pattern recognition (referred to as such in the literature) in which an ideal pattern is compared with the received pattern. The hypothetical decision concerning the presence of a correct address signal is carried out on the basis of the correlator output value which is compared with a threshold value.

Patterns buried deep in the noise can be made recognizable in a digital filter by repetitive sending out and synchronous accumulation of the pattern. A digital filter 16 of the first order, which carries out an accumulation of the type described in EP-A-0 243 885 with reference to FIG. 7a, is provided for this purpose at the input of the address signal correlator 12.

Figure 11:
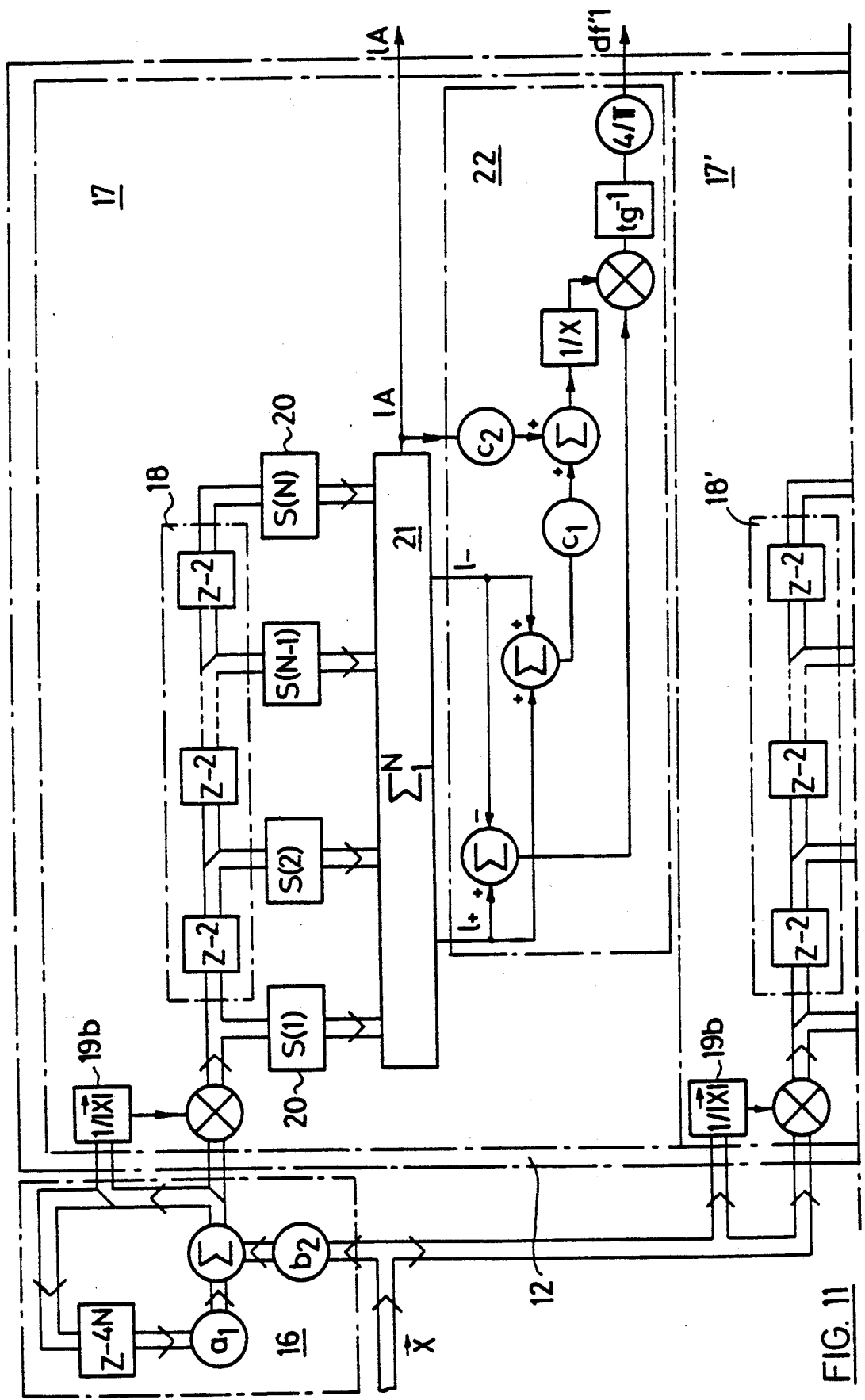
FIG. 11 is a second detail of FIG. 6.

As shown in FIG. 11, the address signal correlator 12 contains two correlators 17 and 17′, each of which may have, for example, a vector shift register 18, 18′ of length 2 times (N−1), where N is the length of the ternary sequence, the FSK-pulses of which appear only in every second vector. The address pattern of FIG. 8 now runs stepwise through the correlators 17 and 17′ per FFT and the address signal correlator 12 indicates an increased value in the event of coincidence.

A problem arises in this connection on account of distortions due to fading, receiver-AGC (AGC=Automatic Gain Control) and signal to noise ratio calculation, these distortions affecting one or the other of the vectors X running through the two correlators 17, 17′. This problem is solved by standardization of the vectors X to the value of 1 according to a limiter function. The magnitude for the hypothesis test 1 is the scaler product of vectors R and S:

$$1 = \text{Vector R times Vector S.}$$

Figure 12:
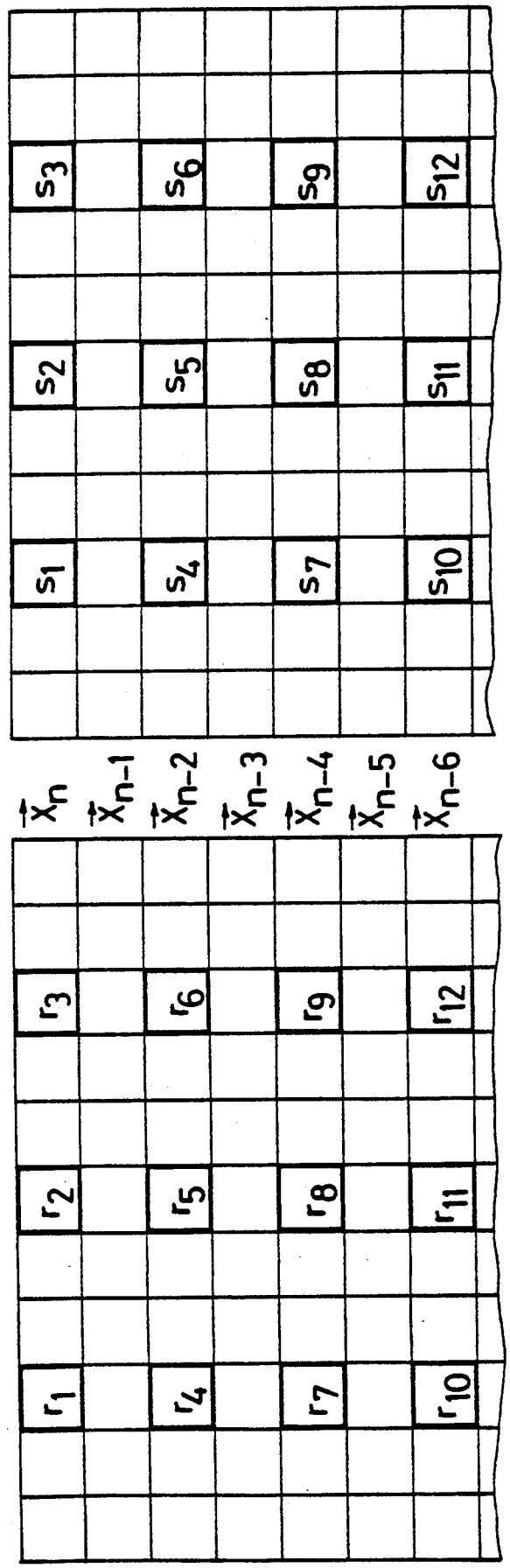
FIG. 12 is a diagram to explain the function of a portion of the present invention.

In this formula, the vector R denotes the standardized reception address and the vector S denotes the ideal pattern address. Standardization of the reception address takes place, firstly, in a scaling stage 19a (FIG. 9) arranged between the FTSK demodulator 11 and the address signal correlator 12 and, secondly, in a standardization or scaling stage 19b (FIG. 11) which fixes the sum energy of vector X to 1. The relationship of the components of the two vectors R and S is shown in FIG. 12.

The signal vector X which has now been standardized with respect to noise and summation energy, is transferred to N (N=length of address signal) decoder elements 20 with a time delay of 2Tp after each vector shift register stage. These decoder elements contain 11 inputs wired according to the reference pattern address for "0", "1" or "2", of which the middle nine inputs are used for recognition of address and frequency offset control. The two outer inputs are set aside as reserves for expansion.

Figure 13:
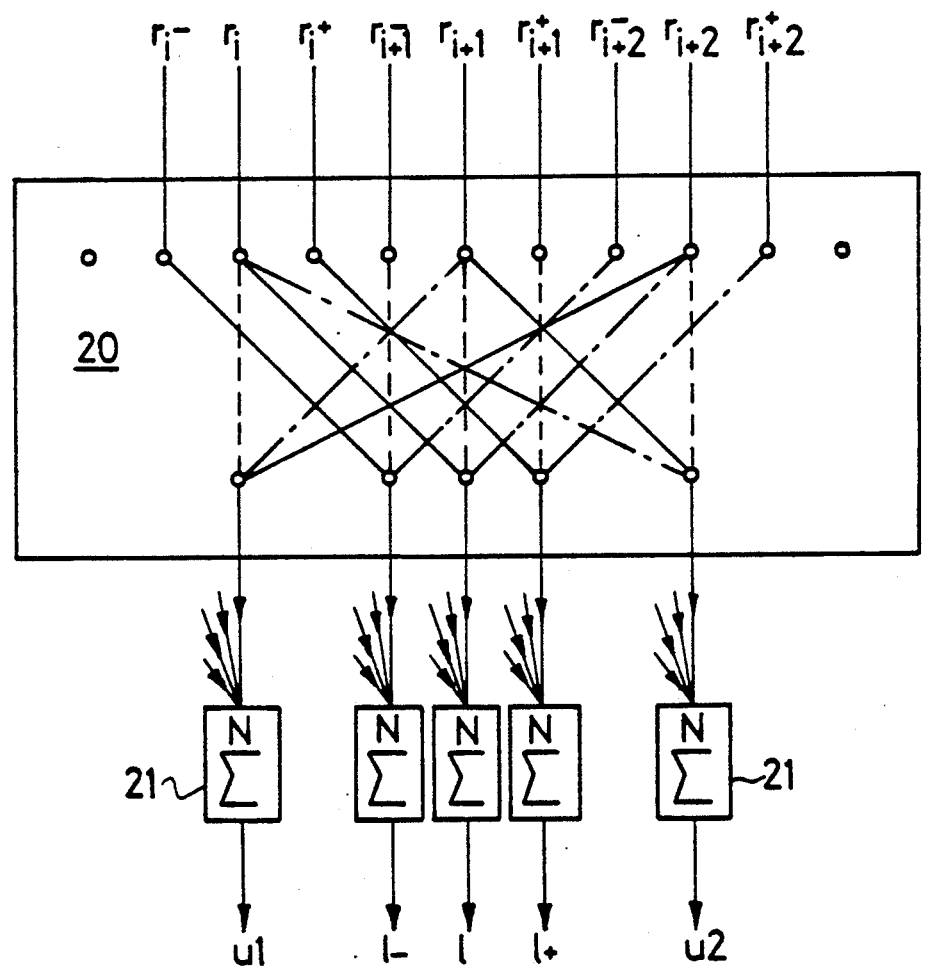
FIG. 13 represents a detail of FIG. 11.

FIG. 13 shows such a correlator-decoder element 20 with summation. The symbols ri and so on denote the nine leads to the inputs of the decoder element 20 which has five outputs leading to corresponding summation members 21. The inputs and outputs of the decoder element 20 are connected together as illustrated, a connection shown in a solid line representing the ternary source symbol "0", a broken line connection representing the symbol "1" and a dash-dot line representing the symbol "2".

The five outputs of the summation stages 21 are marked by the variables u1, 1−, 1, 1+ and u2. The output 1 as sum of the corresponding amounts of all the decoder elements 20 is the true detection variable which decides the appearance of the searched address signal. The decision made on the basis of the sum instead of each individual amount is always more accurate and is related to what is known in the literature as "soft decision".

Figure 14:
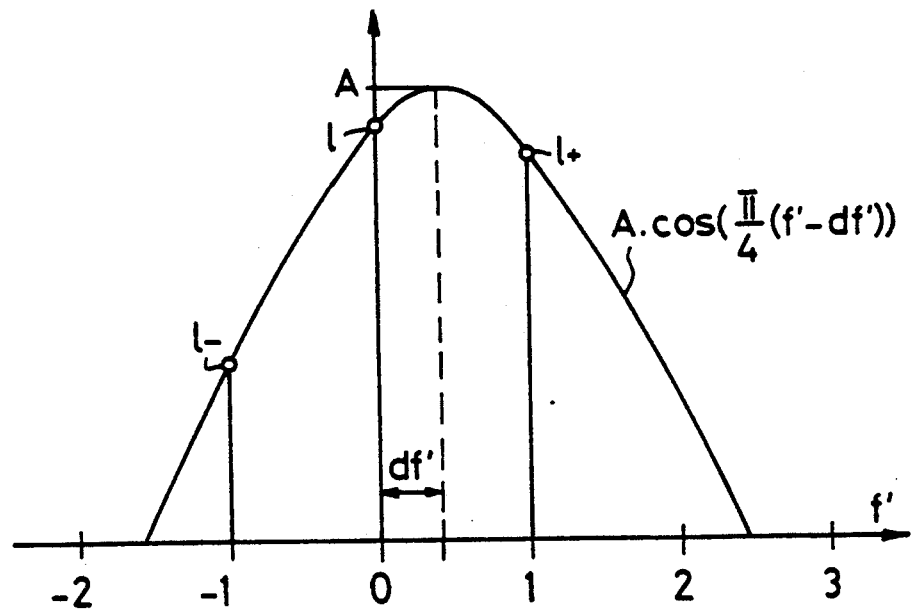
FIG. 14 is diagram to explain the function of a portion of the present invention.

The outputs 1+ and 1− serve to determine the frequency offset (FIG. 14). The outputs u1 and u2 represent the scaler product of the vector R (scaled reception address) with the two sequences which are complementary to the ternary comparison sequence and may be used as control in the manner of an error magnitude.

In the event of an emergency message modem, all decoder elements are, of course, programmable so that a correlation with all possible messages can be carried out. This is possible thanks to the realization of DSP technology (DSP—digital signal processing) since the received signal can be exactly stored and the mathematical correlation can be carried out within a very short time.

According to FIG. 11, each correlator 17, 17′ contains a frequency offset estimator 22 to which are connected the outputs 1+ and 1− of the summation stage 21. Assessment of the carrier frequency offset (central frequency of ternary FSK) enables readjustment of the receiver after detection of the address signal if this has drifted away after reception. This ensures that optimum functioning will be resumed for the subsequent signals or data.

As shown in FIG. 14, the three values 1+, 1− and 1 in the spectrum obtained from the summation 21 (FIG. 11) are viewed as points of a cosine curve in the frequency offset estimator 22 when there is freedom from disturbance. The solution of these three equations on the cosine curve results in:

$$df = (4/\pi) \cdot \arctg\left((1+-1-)/(1++1-)\right)$$

Owing to the statistical dependence of immediately adjacent spectral discrete values when a 4 term Harris window is used in Stage 9 (FIG. 6) before the FFT and the generally noise loaded reception address vector R, a better estimation can be obtained by replacing the term $(1++1-)$ in the denominator of the formula for df by the following expression:

$$9 \cdot 1 - 5, 36 \cdot (1 - + 1 +)$$

The output signals of the two correlators 17 and 17′ of the address signal correlator 12, i.e. the detection variables 1A and 1′A for the signal vector rA and the values df'1 and df'2 for the frequency offset determination, now enter the decision circuit 13 (FIG. 6). The same also happens to the corresponding values for the signal vector rB. The decision "address signal present or absent", estimation of the frequency deviation and determination of the signal to noise ratio take place in the decision circuit 13.

The frequency deviation delta f is then given by the formula:

$$\text{delta } f = 8 \text{ Hz} \cdot df.$$

The frequency deviation delta f thus obtained may be compensated in the frequency adaptation stage 8 (FIG. 6) at the appropriate time.

The system described is adjusted to such operational data that for a probability of detection Pd=0.5 one may expect on average only one false alarm per month of operating time of the address signal receiver. The sensitivity of detection thus corresponds to a signal/noise ratio of −17 dB (2 kHz and band widths) and is increased to about −27 dB by the use of the digital filter 16 (FIG. 11) for the accumulation of weak signals with 10-fold repetition. The possibility of diversity of the two channels brings a further gain of 3 dB which is even substantially greater in the case of interferences by selective signals.

The advantages of realizing the address signal receiver by real time-digital-signal processing lie mainly in the absolute freedom from aging, accurate reproducibility and high flexibility. In addition, optimum operational data are obtained, such as extremely high resistance to selective interference due to the high resolution FFT and robust complex address signals with optimum correlation, thanks to Soft Decision.

These optimum operational data, which cannot be achieved by analog means, enable the system to be used for new applications for which extreme reliability of message transmission and a possibility for selective calling are required. Examples of such applications lie in the ECCM field (ECCM=Electronic counter counter measurement) with active interference or in emergency transmission networks with essential tasks. With a view to an expansion of the system to the transmission of any data under difficult conditions, the following is achieved by the process described:

Frequency, bit and word synchronization are optimally produced and trackable.

When channel conditions are very poor and do not enable reasonable traffic to take place, the stations can be automatically adjusted with suitable measures such as, for example, frequency change, data rates, and the like by virtue of the selective calling device and emergency message code set. This possibility of using a so-called call-up channel under all conceivable circumstances is also very suitable for the synchronization of networks with frequency hopping processes.

Since the system described only uses the AF channel, it may be operated with virtually all existing radio equipment. In addition there is the possibility of adaptive operation of older equipment although this requires the reading of a message and certain manual operations. More recent apparatus can automatically communicate with the apparatus described here by way of their control interface so that adaptive radio communication is possible.

It will be appreciated by those of ordinary skill in the art that the present invention can be embodied in other specific forms without departing from the spirit or essential characteristics thereof. The presently disclosed preferred embodiment is therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Method for the transmission of selective addresses and/or emergency messages in short-wave radio networks having several stations which each include a transmitter and/or a receiver, comprising the steps of:

operating the stations in a channel-in-band scanning mode;

transmitting a calling signal consisting of a synchronization signal and an address signal, using as the address signal a modified FSK signal which forms a diversity pair by subdivision into two identical m-ary frequency-time-shift-keying (FTSK) signals; and, numerically processing a received signal in a frequency-time plane by carrying out a frequency adaption and a transformation of each received FTSK pulse and FTSK slot in a frequency space by a fast Fourier transformation (FFT).

2. Method according to claim 1 wherein the FSK signal which forms the address signal is subdivided into two ternary FSK signals each modulated with a specified 26 bit long code sequence and each tone of the two ternary FSK signals being offset by a multiple of 8 Hz and each ternary signal being on/off modulated in time intervals.

3. Method according to claim 2, further comprising the steps of:

fixing a symbol rate of the address signal at 16 Bd;

matching the FFT with 8 Hz resolution for each diversity part signal;

using synchronization information for proper timing of an FFT window from a preceding 16 Hz modulated AM signal; and, fixing the length of an FTSK pulse of a diversity part signal at 62.5 ms.

4. Method according to claim 3, further comprising the steps of:

only occupying every second character interval for each diversity part signal with an FSK pulse so that no transmission energy exists in intermediate pulse intervals;

detecting energy in the intermediate pulse intervals originating from any interferences present;

subtractively eliminating said interferences from the transmission energy such that a total signal envelope at the pulse intervals is constant.

5. Method according to claim 1, further comprising the steps of:

repetitively sending out the address signal for accumulating a noisy signal in digital filters of the receiver and thereby suppressing the noise until a successful signal detection decision is made;

adaptively increasing the transmission time in the absence of a successful signal detection decision acknowledgement in accordance with the signal/noise ration on the channel; and, using all preceding demodulated values as so-called Soft Decision values for deciding on message data received.

6. Method according to claim 5, further comprising the steps of:
- dividing a transmission channel into two halves for the two signals of the diversity pair;
- subdividing each half into m subchannel pairs; and,
- carrying out a constant search run at the receiver in the subchannel pairs.

7. Method according to claim 6, further comprising the step of:
- automatically selecting a suitable subchannel within the transmission channel prior to a transmission.

8. Method according to claim 6, further comprising the steps of:
- operating two radio networks in the same channel; and
- using different address signals for the two networks.

9. Method according to claim 6, wherein self-synchronizing codes, preferably gold codes, are used for the address signals.

10. Apparatus for transmitting selective addresses and/or emergency messages in shortwave radio networks having several stations which each include a transmitter and/or a receiver, comprising:
- a transmitter for transmitting a calling signal consisting of a synchronization and an address signal, the address signal being a modified FSK signal which forms a diversity pair by subdivision into two identical m-ary frequency-time-shift-keying (FTSK) signals; and,
- a receiver which further includes analog input circuits and a digital signal processor for numerical processing of a received signal in a frequency-time plane, the signal processor carrying out a frequency adaption and a transformation of each FTSK pulse and FTSK slot in a frequency space using a fast Fourier transformation (FFT).

11. Apparatus according to -claim 10, wherein said analog input circuits produce output signals represented by signal vectors and wherein said signal processor further includes
- means for weighting said signal vectors using a window function prior to transformation by said fast Fourier transformation.

12. Apparatus according to claim 11, wherein an output of said fast Fourier transformation is connected to a means for effecting FTSK demodulation of said signal vectors.

13. Apparatus according to claim 12, wherein the demodulation means includes a transversal filter with several taps and a noise estimator for calculating filter coefficients of said filter.

14. Apparatus according to claim 13, wherein said signal processor further includes an address signal correlator connected to an output of said demodulation means; and,
- a decision circuit connected to an output of said address signal correlator.

15. Apparatus according to claim 14, wherein said signal processor further includes a first order digital filter arranged between the demodulation means and the address signal correlator.

16. Apparatus according to claim 15, wherein the address signal correlator has two correlators.

17. Apparatus according to claim 16, wherein each of said two correlators includes a vector shift register for individually correlating direct signal values and filtered signal values.

18. Apparatus according to claim 17, wherein the length of each vector shift register is 2·(N−1), where N is the length of an m-ary reception sequence, m corresponding to the number of frequencies used to encode an address or message in each FSK signal of a diversity pair.

19. Apparatus according to claim 18, further including decoder elements connected to stages of each vector shift register for receiving the signal vectors.

20. Apparatus according to claim 19, wherein each decoder element has at least nine inputs for address recognition and frequency offset control, which inputs are wired or programmed according to a particular reference pattern address.

21. Apparatus according to claim 20, wherein outputs of each decoder element are connected to summation means and wherein an output signal of the summation means, namely an output signal which represents a sum of corresponding amounts of all decoder elements, forms a detection variable which corresponds to the appearance of a searched address signal.

22. Apparatus according to claim 20, wherein each of said two correlators contains a frequency offset estimator for estimating a carrier frequency offset, said estimated carrier frequency offset being transferred to the decision circuit.

23. Apparatus according to claim 22, wherein said estimated carrier frequency offset is also fed back to a frequency adaptation means for tracking purposes, said frequency adaptation means being connected between said analog input circuits and said weighting means.

* * * * *

UNITED STATES PATENT AND TRADEMARK OFFICE
CERTIFICATE OF CORRECTION

PATENT NO. : 5,005,209

DATED : April 2, 1991

INVENTOR(S) : Roland Kung et al.

It is certified that error appears in the above-identified patent and that said Letters Patent is hereby corrected as shown below:

On the title page, please insert item [30]:
Foreign Application Priority Data

September 29, 1987, [CH] Switzerland .... 03795/87-2

Signed and Sealed this

Twenty-second Day of September, 1992

Attest:

DOUGLAS B. COMER

*Attesting Officer*   *Acting Commissioner of Patents and Trademarks*